United States Patent
Womer et al.

(10) Patent No.: US 6,488,399 B1
(45) Date of Patent: Dec. 3, 2002

(54) APPARATUS FOR PLASTICATING THERMOPLASTICS

(76) Inventors: Timothy W. Womer, Box 286, E. River Rd., Edinburg, PA (US) 16116; Brian L. Lepore, 1010 W. Clayton St., New Castle, PA (US) 16102

(*) Notice: Subject to any disclaimer, the term of this patent is extended or adjusted under 35 U.S.C. 154(b) by 68 days.

(21) Appl. No.: 09/860,103

(22) Filed: May 17, 2001

(51) Int. Cl.$^7$ .................................................. B29B 7/42
(52) U.S. Cl. ............................ 366/81; 366/88; 366/90
(58) Field of Search .......................... 366/81, 88, 89, 366/90, 324

(56) References Cited

U.S. PATENT DOCUMENTS

| | | | |
|---|---|---|---|
| 2,669,750 A | * 2/1954 | Keeney | 366/89 |
| 2,680,879 A | * 6/1954 | Schnuck et al. | 366/88 |
| 2,753,595 A | 7/1956 | Dulmage | |
| 3,006,029 A | 10/1961 | Saxton | |
| 3,427,003 A | * 2/1969 | Schneider et al. | 366/307 |
| 3,486,192 A | 12/1969 | Le roy | |
| 3,524,222 A | 8/1970 | Gregory et al. | |
| 3,652,064 A | 3/1972 | Lehnen et al. | |
| 3,936,038 A | * 2/1976 | Olmsted | 366/192 |
| 3,941,535 A | 3/1976 | Street | |
| 3,989,434 A | * 11/1976 | Mercer | 366/96 |
| 4,085,461 A | 4/1978 | Maillefer | |
| 4,201,481 A | 5/1980 | Iddon et al. | |
| 4,215,978 A | 8/1980 | Takayama et al. | |
| 4,227,870 A | 10/1980 | Kim | |
| 4,277,182 A | 7/1981 | Kruder | |
| 4,405,239 A | 9/1983 | Chung et al. | |
| 4,639,143 A | 1/1987 | Frankland, Jr. | |
| 4,752,136 A | 6/1988 | Colby | |
| 4,846,659 A | * 7/1989 | Nakamura | 235/105 |
| 5,033,860 A | * 7/1991 | Nakamura | 366/89 |
| 5,044,759 A | * 9/1991 | Gagliani | 366/88 |
| 5,064,293 A | * 11/1991 | Nakamura | 366/324 |
| 5,215,764 A | 6/1993 | Davis et al. | |
| 5,816,698 A | 10/1998 | Durina et al. | |

* cited by examiner

Primary Examiner—Tony G. Soohoo
(74) Attorney, Agent, or Firm—Robert J. Herberger

(57) ABSTRACT

A plasticating screw having a main channel defined by a helical flight disposed within and cooperating with an inner-wall of a heated barrel. The screw has a longitudinal portion with a plurality of staggered rows of noncontinuous advancing grooves arranged in the main channel thereof. The axis of each row of advancing grooves being substantially parallel to the helical axis of the adjacent helical flight of the longitudinal portion. A noncontinuous helical channel is formed therein traversing in a reverse direction, compared with the direction of the helical flight, the channel having a plurality of retracting grooves. Each retracting groove cuts through at least one pass of the main channel of the longitudinal portion, including the advancing grooves therein, and intersects and passes through the helical flight at least once, so that molten resin can back flow and re-circulate therethrough.

20 Claims, 5 Drawing Sheets

APPARATUS FOR PLASTICATING THERMOPLASTICS

FIELD OF THE INVENTION

This invention relates to plasticating using a screw rotatable within a barrel to extrude or inject molten resinous material. More particularly, this invention relates to a longitudinal portion of the screw designed to recirculate material for thorough mixing and melting.

BACKGROUND OF THE INVENTION

A plasticating apparatus commonly used today receives polymer or thermoplastic resin pellets, granules or powders, from an inlet port, then heats and works the resin to convert it into a melted or molten state. The melt or molten material is delivered under pressure through a restricted outlet or discharge port to make the finished article. It is desirable that the molten material leaving the apparatus be completely melted and homogeneously mixed, resulting in uniform temperature, viscosity, color and composition.

The basic plasticating apparatus includes an elongated cylindrical barrel which usually is heated at various locations along its length. An axially supported and rotating screw extends longitudinally through the barrel. The screw is responsible for forwarding, melting, pressurizing and homogenizing the material as it passes from the inlet port to the outlet port. The screw has a core with a helical flight thereon and the flight cooperates with the cylindrical inner surface of the barrel to define a helical valley for forward passage of the resin to the outlet port.

Since there are several different types of thermoplastic resins or polymers, and with each having different physical properties and characteristics, there are different screw configurations. In general, however, the typical plasticating screw has a plurality of sections along its extended axis with each section being designed for a particular function. Ordinarily, there is a feed section, a transition section and a metering section in series. In the art, the transition section has been referred to interchangeably as the intermediate, compression or melt section.

The feed section extends forward from the inlet port of feed opening where solid thermoplastic resins, in pellet, granular or powder form, are introduced into the apparatus and pushed forward by the screw along the inside of the barrel. The resin is then worked and heated in the transition section so that melting occurs. After approximately 40 to 80 percent of the resin has been melted, solid bed breakup occurs, and solids become randomly dispersed within the melt. It is important to note that most melting initially occurring in the transition section takes place at or near the heat source of the barrel. Then, melting and mixing become enhanced as solids subsequently become broken up, redistributed and dispersed within the melt. To assure a homogeneous melt, therefore, it is important that the transition section enhances turbulent flow, as opposed to laminar flow, so that all the resin comes within the heating vicinity of the barrel or is dispersed within the melt. Otherwise, the presence of minute unmelted resin particles will appear in the finished article.

Typically the transition section has a decreased root depth of the helical valley, as compared with the feed section, to reflect the volume reduction due to melting of the feed and the elimination of air spaces between the solid particles. The transition section leads to the metering section. The metering section, as one of its intended functions, provides a constant flow of molten material toward the outlet port. In addition, it is important that the metering section melt any unmelted solids and mix and maintain the molten resin in a homogeneous and uniform composite until discharged through the outlet port.

The melting and mixing functions are enhanced by using screw configurations which increase the compression and shearing force applied to the resin by the screw. Compression and shearing increase turbulence, tumbling and mixing of material, resulting in increased homogeneity. The process also converts mechanical energy to thermal energy, resulting in a temperature rise of the material. While higher shear rates provide better mixing, the higher temperature resulting therefrom can cause excessive degradation of the resin or cause processing problems downstream of the screw. A wide variety of plasticating screws of different designs have been developed, therefore, to address this problem.

U.S. Pat. No. 4,639,143 discloses an improvement in plasticating screws with a portion in at least one of the sections of a typical apparatus having a plurality of discrete grooves arranged in a noncontinuous helix cut into the root of the screw, within and preferably parallel to the helical valley. The grooves cooperate with the helical flight in advancing the molten resin forward along the longitudinal axis of the apparatus towards an outlet port and are dimensioned to receive the resin in a manner whereby appropriate shear force is applied where needed. The resin passes down the helical path flowing from groove to groove in random fashion, which enhances mixing. Molten resin easily flows forward through the advancing grooves, where it is subjected to lower shear forces, while unmelted solids flow over grooves and barrier lands with proportionately higher shear forces than in the grooves alone. As a result, these higher shear forces are intended to break up the residual solid materials, increase temperature to help with the melting process and enhance mixing to allow for the transfer of heat by conduction.

Although this configuration may satisfy many general needs, thermal and composite mixing can be improved even more for various thermoplastic resin and polymer materials by having a novel longitudinally cylindrical or tapered portion that allows for a continuous back flow and recycling of molten material. The objective of the present invention is to substantially improve on prior screw designs by providing a plasticating screw having a modified longitudinal melting and chaotic mixing portion. At the same time this invention permits greater temperature control to avoid the overheating or degradation of the resin. Ultimately, the primary objective of the instant invention is to homogeneously mix select resins, resulting in a completely molten material having uniform temperature, viscosity, color and composition.

SUMMARY OF THE INVENTION

The present invention provides an improvement in a plasticating apparatus having a heated barrel with an axial length wherein solid material is introduced through an inlet port and exits as molten material through an outlet port of the barrel. The heated barrel has an inner-wall and a screw rotatably supported therein. The screw further comprises at least one helical flight extending along its length to define a helical channel with the inner-wall.

Said screw typically comprises at least a feed section cooperating with said inlet port, an intermediate melt section, and a metering section cooperating with said outlet port. A longitudinal portion is included in at least one of said sections of the screw, having a plurality of noncontinuous advancing grooves with a closed-ended arranged in said helical channel. The advancing grooves are dimensioned to receive said material therein as the material is being conveyed toward the outlet port. The improvement herein comprises a plurality of noncontinuous retracting grooves traversing the axial length of the longitudinal portion of the screw in a reverse direction as compared with the helical direction of said flight. Each retracting groove passes through the helical flight at least once so that molten resin can back flow, recirculate and chaotically mix within the longitudinal portion of the instant invention.

In accordance therewith, the melting and mixing functions of the screw are enhanced, while better controlling the temperature within the plasticating apparatus. The instant invention further reduces resin degradation and increases uniformity of the temperature, viscosity, color and composition of the molten material ultimately discharged downstream. Many other objectives and features of the present invention will be obvious to those of skill in the art upon contemplation of the entire disclosure herein in connection with the accompanying drawings.

DESCRIPTION OF THE DRAWINGS

It is to be understood, however, that the drawings are designed for the purpose of illustration only and not as a definition of the limits of the instant invention, for which reference should be made to the claims appended hereto. Other features, objects and advantages of this invention will become clear from the following more detailed description made with reference to the drawings in which:

DESCRIPTION OF THE PREFERRED EMBODIMENTS

Figure 1:
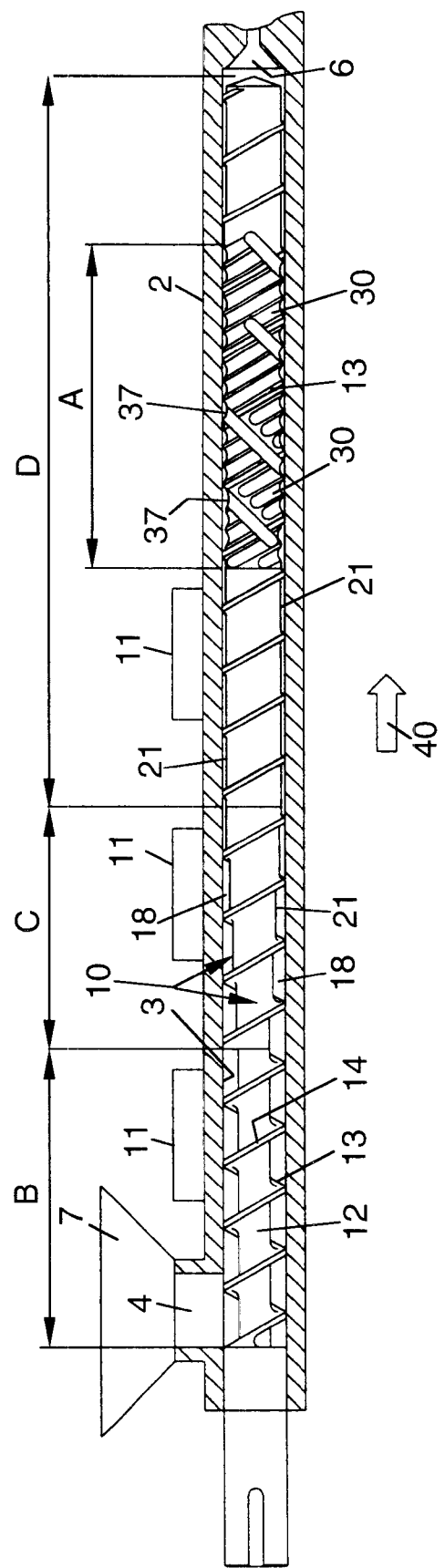
FIG. 1 shows a plasticating device with a screw having the longitudinal portion of the instant invention.

Referring to FIG. 1, a plasticating apparatus can be seen comprising a cylindrical barrel 2 with an inner surface or wall 3. The barrel 2 is provided with inlet port 4 for the admission, via a feed hopper 7, of one or more solid particulate resinous materials and any required additives or agents. The barrel 2 is also provided with a discharge or outlet port 6 for the discharge of plasticated molten extrudate to a mold or die (not shown) or other exit configuration. Any conventional heating elements 11 can be provided outside of the barrel 2 for applying heat to the barrel 2. There may also be a vent through the barrel 2 of the apparatus so that any undesirable matter in the resin may volatilize or that other materials may be introduced later in the process.

Within the barrel 2 is an axially supported screw 10 which is rotated and which extends from the inlet port 4 to the outlet port 6. In the preferred embodiment the screw 10 includes a helical flight 13 radially extending from and winding around a core or shaft 12, typically in a right hand threaded direction. However, a plurality of flights is also acceptable.

The helical flight 13 includes a flight land 14 which move in close cooperative association with the inner surface 3 of the barrel 2. The helical flight 13 defines a helical valley 21 forming a main helical channel 18 bounded by flight 13, inner surface 3 of the barrel 2 and the surface of the core 12. The depth of the helical valley 21 is measured radially from the core surface to the inner surface 3 of the barrel 2 and referred to as the root depth. With the rotation of the screw 10, the helical channel 18 forces a forward flow of resinous materials.

The screw 10 includes a plurality of sections along its axial length, with each section intended to achieve a particular function. As previously stated, there is typically a relatively deep root feed section B for the admission, heating and working of solid resin, a transition section C of reducing root depth to adapt to the reduced volume of resin due to melting and the elimination of air spaces between the solid particles, and a relatively shallow root metering section D wherein the resin is predominantly in a molten state. The inlet port 4 is typically at the rear-most part of the upstream feed section B and the outlet port 6 is the forward-most part of the downstream metering section D. Apart from the improved longitudinal portion A, the screw 10 can have any suitable design.

Figure 2:
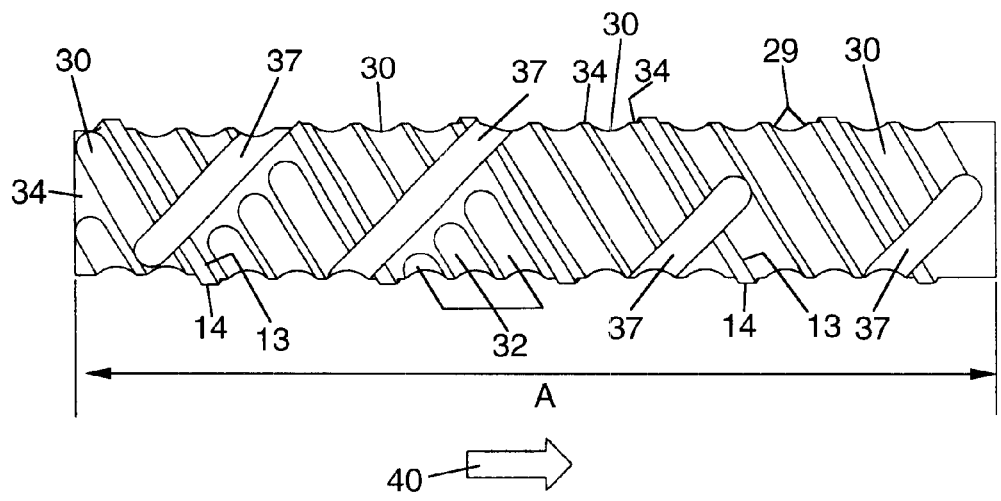
FIG. 2 shows an enlarged view of the longitudinal portion located in the metering section of the screw illustrated in FIG. 1.

Viewing the improved longitudinal portion A shown in FIG. 2, the surface of the core 12 therein includes a plurality of noncontinuous advancing strata grooves 30 in rows 32. The advancing strata grooves 30 are arranged to make a forward helical pathway in the helical channel 18. The advancing strata grooves 30 are cut into the surface of core 12. Typically, there is a plurality of adjacent strata grooves per channel, preferably three as shown, and the strata grooves have therebetween and adjacent thereto shallow barrier lands 34. The barrier lands 34 are preferably level and have a substantially uniform depth. The advancing strata grooves 30 are generally elliptically tapered in the preferred application. The barrier lands 34 and advancing strata grooves 30 extend side by side forming a helical path having the same pitch as each other. Further, the advancing strata grooves 30 are parallel to and have the same helical pitch as the forward helical flight 13.

Figure 3:
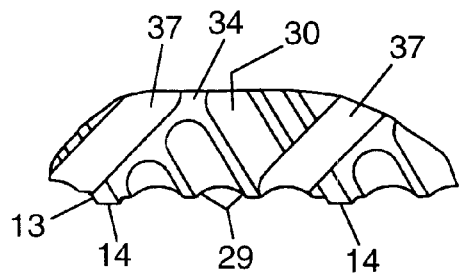
FIG. 3 is an enlarged partial view taken from the improved longitudinal portion.
Figure 4:
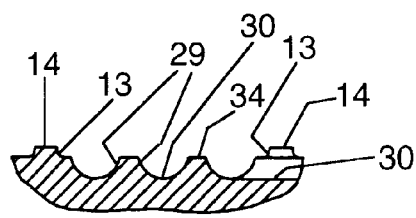
FIG. 4 is a cross-section of the improved longitudinal portion taken along lines 4—4 of FIG. 6.
Figure 5:
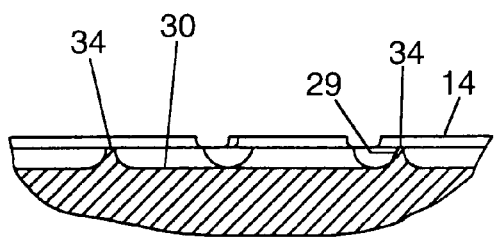
FIG. 5 is a cross-section of the improved longitudinal portion taken along lines 5—5 of FIG. 6.

Viewing FIG. 3, the depth differential between the barrier lands 34 and advancing strata grooves 30 is bridged by descending or ascending shoulders 29 without any intervening barrel flight or obstruction so that there is unimpeded flow of resin between the two levels. The depth of the advancing strata grooves 30 is between about 1.2 and 2.5 times the depth of the barrier land 34 measured from inner surface 3 of the barrel 2, although depths below and above the ratio are acceptable.

The improved longitudinal portion A has a plurality of staggered rows of noncontinuous transit retracting grooves 37 cut into the surface of the core 12. In the preferred application of the invention, the axis of each retracting groove 37 is parallel to the other retracting grooves 37 and is in a left handed helical direction, which is reverse of the direction of the forward helical flight 13. The retracting grooves 37 preferably have the same depth and diameter as the advancing strata grooves 30, although a tapered depth, as well as depths above and below the depth of the advancing strata grooves 30 are acceptable. Also, the retracting grooves 37 preferably have a pitch equal, although opposite, to the pitch of the forward helical flight 13. However, it is acceptable to have the pitch of the retracting grooves 37 range between 0.5 and 2 times the pitch of the forward helical flight 13. Again though, for purposes of this ratio it must be kept in mind that the retracting grooves 37 have a pitch opposite to that of the helical flight 13.

Figure 6:
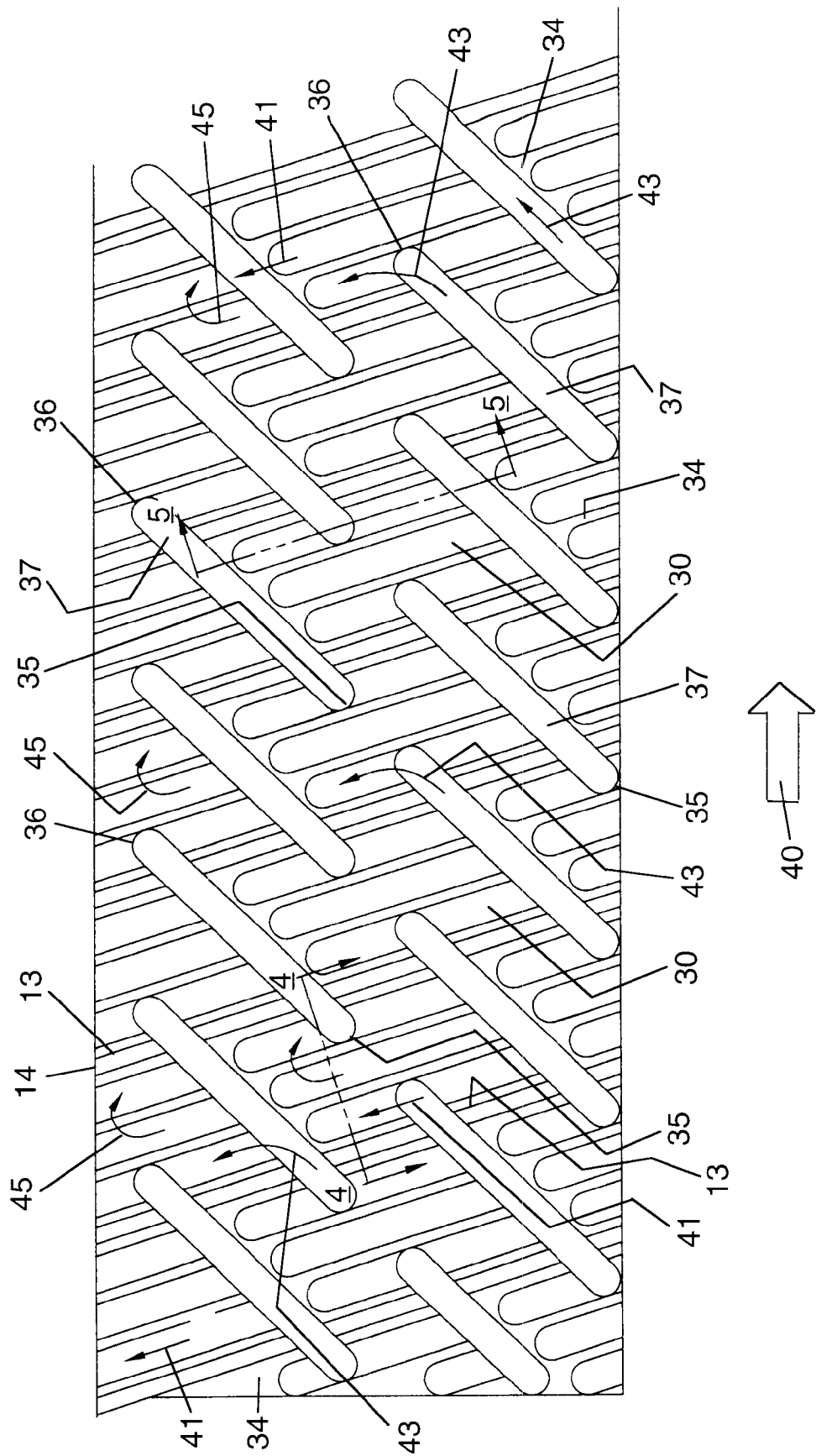
FIG. 6 illustrates the backward flow occurring in the improved longitudinal portion, as well as the forward tumbling, shearing and mixing action occurring between the advancing and retracting grooves and over the barriers therebetween.
Figure 7:
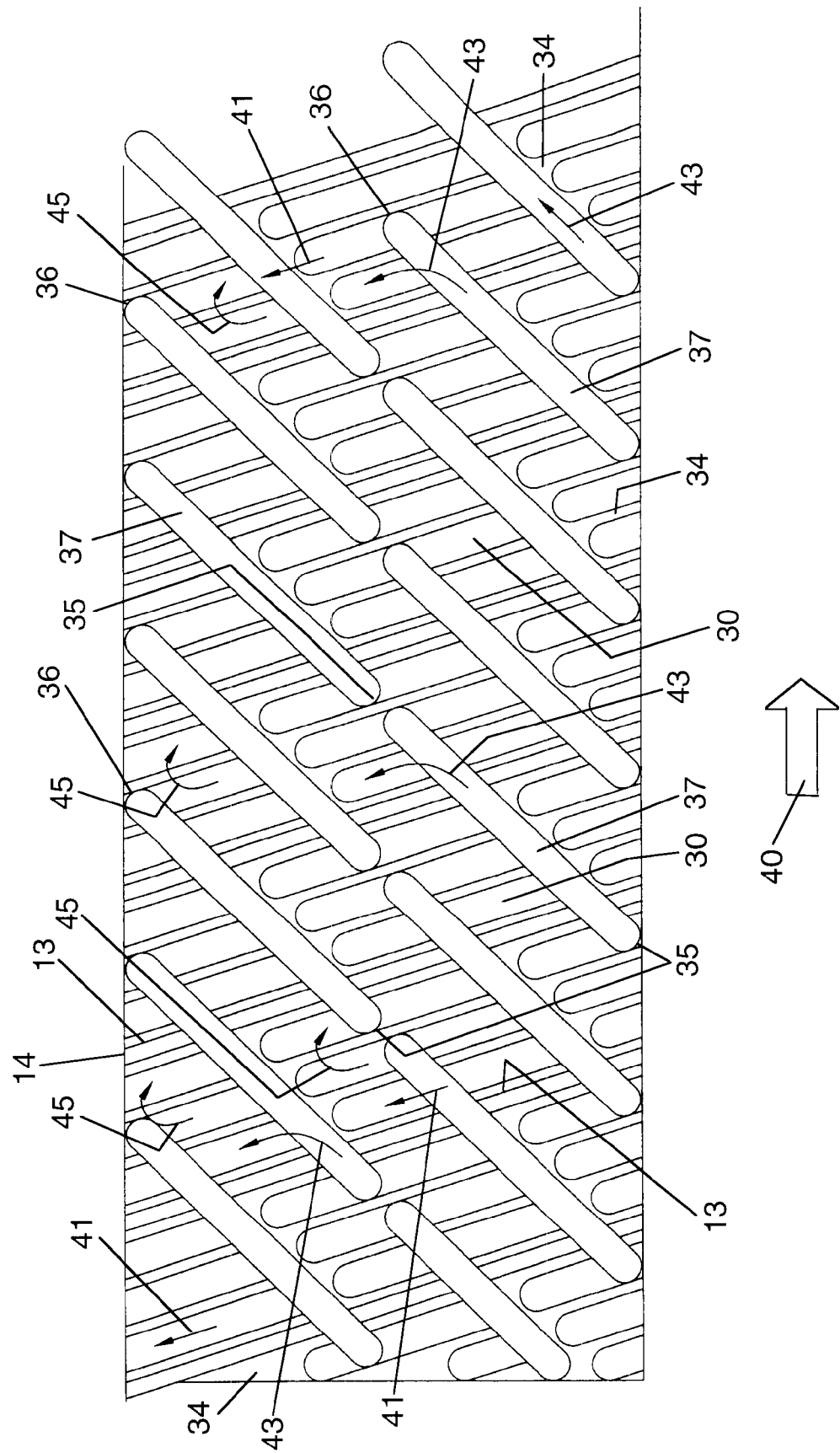
FIGS. 7 and 8 are illustrations of the same as shown in FIG. 6, but with alternative lengths of the noncontinuous retracting grooves.
Figure 8:
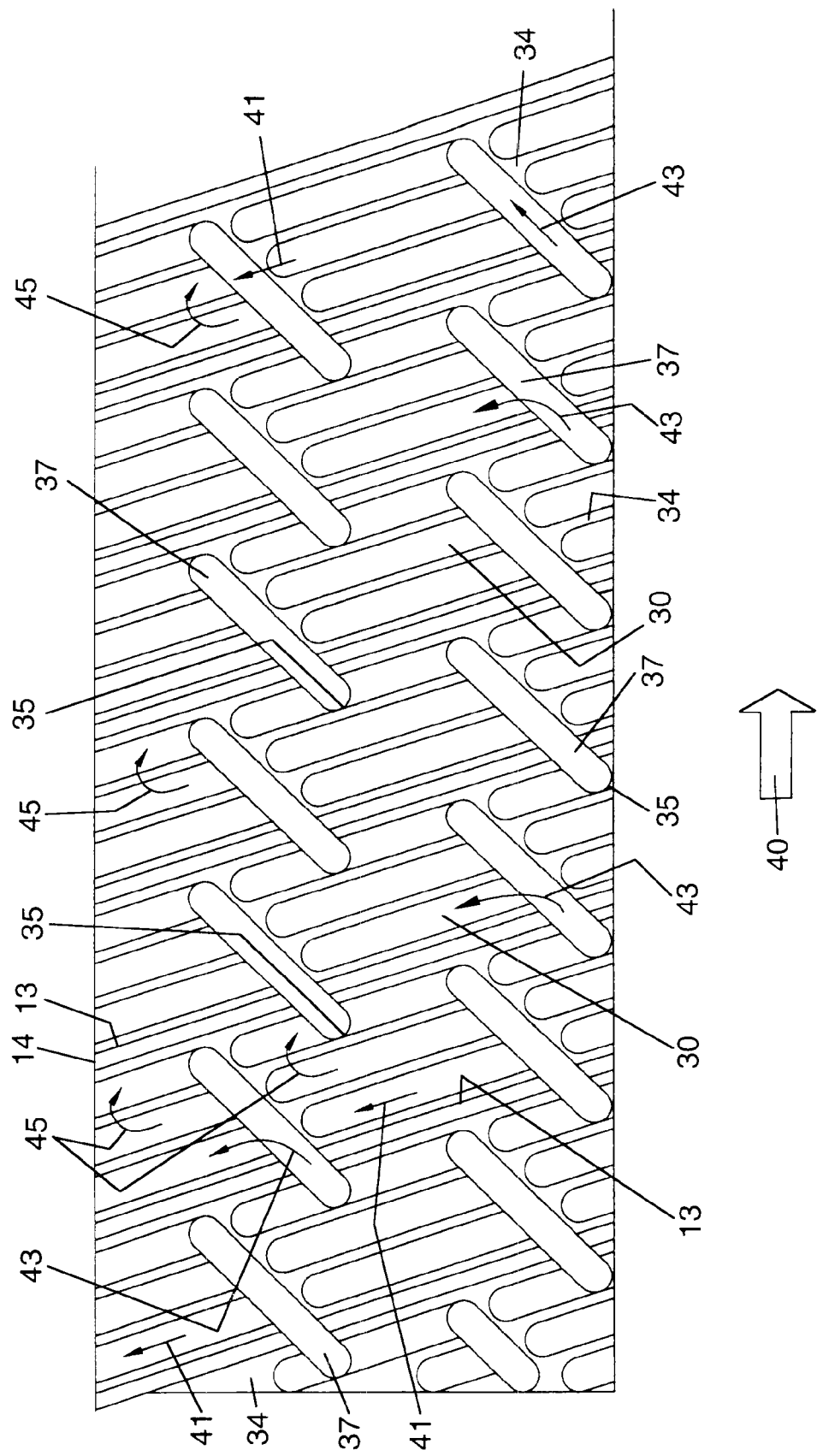

The helical length of the noncontinuous retracting groove 37 can vary. Each retracting groove 37 intersects and cuts through the forward helical flight 13 at least once, and preferably no more than two times as illustrated in FIGS. 6, 7 and 8. More specifically, as illustrated in FIG. 6, the length of the each retracting grooves 37 shown therein makes the following path while intersecting the forward helical flight 13 twice: beginning at its rear-most end 35 within one of the strata grooves 30; extending downstream in a reverse helical path before intersecting the said helical flight 13 the first time; traversing the helical valley 21 otherwise formed by said helical flight 13; intersecting the said helical flight 13 a second time; and finally terminating at its forward-most end 36 within a downstream strata grooves 30. FIG. 7 is an alternative design showing the retracting groove 37 having a slightly longer length: beginning at its rear-most end 35 within one of the strata grooves 30; extending downstream in a reverse helical direction and passing through intervening strata grooves 30 before intersecting said helical flight 13 the first time; traversing the helical valley 21 otherwise formed by said helical flight 13; intersecting the forward helical flight 13 a second time; and finally terminating at its forward-most end 36 within a downstream strata grooves 30. Finally, FIG. 8 shows yet another embodiment of the invention where the noncontinuous retracting groove 37 intersects the forward helical flight 13 only once.

In operation, the flow pattern and effect on the molten resin caused by the progressive change in root depths between the advancing strata grooves 30, barrier lands 34 and the intersecting transit retracting grooves 37 of the improved longitudinal portion A can be seen in FIGS. 6, 7 and 8. Arrow 40 indicates the ultimate forward direction of the molten resin made by the forward helical flight 13. Arrow 41 shows the direction of the resin flow through the main channel 18 thereof. Since the depth of the advancing strata grooves 30 is different than the depth of the barrier lands 34, the change in root depths causes the molten resin to experience a massaging effect as it is forced along the helical valley 21, as shown by the mixing arrows 45. The mixing indicated by arrows 45 between the barrier land 34 and advancing strata groove 30 imparts an undercurrent and ultimately turbulence to an otherwise linear flow stream of molten resin. The progressive tumbling and massaging of the molten resin is then interrupted as it comes within the path of the transit retracting groove 37. The retracting groove 37 allows some of the molten resin to flow back or retract in the reverse direction of the forward resin flow 40, as shown by arrow 43. The resin flowing in a reverse direction 43 forms a tributary to the upstream forward flow until the material is again forced forward by the forward helical flight 13 or shoulder 29 of the barrier land 34. As a tributary flow pattern is optimally achieved within the improved longitudinal portion A (indicated by flow arrows 41, 43 and 45), molten resin is ultimately advanced forward toward the outlet port 8 as it mixes and re-circulates therethrough. As a result, the chaotic mixing within the improved longitudinal portion A is greatly enhanced by redistributing molten material back through the improved longitudinal portion A.

Depending on the particular application and resin material, the improved longitudinal portion A described herein can be placed anywhere along the length of the screw 10. However, the preferably located in either the forward most end of the transition section C or in the rearward most end of the metering section D. FIG. 1 shows the improved longitudinal portion A in the metering section D.

It will thus be seen that a new and useful plasticating apparatus, method and improved longitudinal portion have been illustrated and described. It will be apparent to those skilled in the art that various changes or modifications may be made to the invention without departing from the spirit thereof.

What is claimed is:

1. A plasticating apparatus of the type having a heated barrel with an axial length wherein solid material is introduced through an inlet port and exits as a molten material through an outlet port, the heated barrel having an inner-wall and a screw rotatably supported therein, the screw having a core and at least one helical flight extending along its length defining a helical channel with the inner wall, said screw including at least a feed section cooperating with said inlet port, an intermediate melt section, and a metering section cooperating with said outlet port, the improvement comprising:

a longitudinal portion in at least one of said screw sections, the longitudinal portion having a plurality of advancing grooves with each having at least one closed-end, said advancing grooves being arranged in a noncontinuous helix cut in the screw core in said helical channel of the screw, said plurality of advancing grooves being dimensioned to receive said material therein as the material is conveyed through said channel to said outlet port; and said longitudinal portion further having a plurality of noncontinuous retracting grooves traversing several advancing grooves, the retracting grooves forming a reverse helical path compared with the helical path of said flight, each retracting groove passing through the helical flight not more than two times so that some molten resin can back flow and recirculate within said longitudinal portion.

2. The screw of claim 1, further comprising barriers adjacent to said advancing grooves to prevent the advancing grooves from directly communicating with one another.

3. The screw of claim 2, wherein each noncontinuous retracting groove has an end in one of the advancing grooves.

4. The screw of claim 2, wherein each noncontinuous retracting groove traverses at least two advancing grooves and passes through the helical flight only once.

5. The screw of claim 2, wherein the helical path o f the retracting grooves has a pitch being substantially equal but opposite to a pitch of the forward helical flight in said longitudinal portion.

6. The screw of claim 2, wherein the advancing grooves have a maximum depth which is substantially equal to a maximum depth of the retracting grooves.

7. The screw of claim 6, wherein the maximum depth of the advancing grooves is between about 1.2 and 2.5 times a depth of the barriers relative to the inner-wall of the barrel.

8. A longitudinal portion of a screw of a plasticating device, wherein the screw has a core with a helical flight, the helical flight of the screw cooperating with an inner-wall of a heated barrel forming a helical channel, the screw having an axial length with an upstream section where material is fed into the plasticating device and a downstream section where material exits the plasticating device, the longitudinal portion comprising:

a plurality of advancing grooves with each having at least one closed-end, said advancing grooves being arranged in a noncontinuous helix cut forming a maximum advancing groove depth in the core in said helical channel of said screw, said plurality of advancing grooves being dimensioned to receive said material therein as the material is conveyed through said channel of the longitudinal portion toward said outlet port;

barriers adjacent to advancing grooves to prevent the advancing grooves from directly communicating with one another; and a plurality of noncontinuous retracting grooves having a maximum retracting groove depth and making a helical pattern traversing several advancing grooves in a reverse helical direction as compared with the helical direction of said flight, and each retracting groove passing through the helical flight not more than three times so that some molten resin can back flow and recirculate within said longitudinal portion.

9. The longitudinal portion claim 8, wherein each noncontinuous retracting groove has an end in one of the advancing grooves.

10. The longitudinal portion of claim 8, wherein the maximum depth of the advancing grooves is substantially equal to the maximum depth of the retracting grooves.

11. The longitudinal portion of claim 9, wherein each noncontinuous retracting groove traverses at least two advancing grooves and passes through the helical flight not more than two times.

12. The longitudinal portion of claim 11, wherein the helical path of the retracting grooves has a pitch being substantially equal but opposite to a pitch of the forward helical flight being passed through.

13. The longitudinal portion of claim 10, wherein the maximum depth of the advancing grooves is between about 1.2 and 2.5 times a depth of the barriers relative to the inner-wall of the barrel.

14. A process of plasticating resinous material into a molten state under pressure, the process comprising the steps of:

a) feeding solid resinous material to a rotating screw in a barrel having a cylindrical inner surface, said screw having a core and a helical flight with said flight cooperating with said inner surface to move said material forward through a helical channel and toward an outlet port;

b) applying heat to said barrel and said material while working the material between the barrel and the screw to convert the solid material to a solid-molten combination state;

c) mixing and shearing said solid-molten combination with an improved longitudinal portion in the screw to form a substantially homogeneous molten material having substantially uniform temperature, viscosity, color and composition, the improved longitudinal portion comprising a plurality of advancing grooves with each having at least one closed-end, said advancing grooves being arranged in a noncontinuous helix cut forming a maximum depth in the core of said helical channel, said plurality of advancing grooves being dimensioned to receive said material therein as the material is conveyed through said helical channel of the longitudinal portion toward said outlet port, barriers adjacent to said advancing grooves to prevent the advancing grooves from directly communicating with one another, and a plurality of noncontinuous retracting grooves having a maximum depth and making a pattern traversing several advancing grooves in a reverse helical direction as compared with the helical direction of said flight, each retracting groove passing through the helical flight not more than two times so that some of material in said longitudinal portion can back flow and recirculate therethrough; and d) metering said substantially homogeneous molten material though said outlet port.

15. The process of claim 14, wherein each noncontinuous retracting groove has an end in one of the advancing grooves.

16. The process of claim 14, wherein the maximum depth of the advancing grooves substantially equal to the maximum depth of the retracting grooves.

17. The process of claim 16, wherein each noncontinuous retracting groove traverses at least three advancing grooves and passes through the helical flight not more than two times.

18. The process of claim 17, wherein the helical path of the retracting grooves has a pitch being substantially equal but opposite to a pitch of the forward helical flight being passed therethrough.

19. The process of claim 18, wherein the maximum depth of the advancing grooves is between about 1.2 and 2.5 times a depth of the barriers relative to the inner-wall of the barrel.

20. A plasticating screw having a main channel defined by a helical flight disposed within and cooperating with an inner-wall of a heated barrel, the improvement comprising:

a longitudinal portion of the screw having a plurality of staggered rows of noncontinuous advancing grooves arranged in the main channel, an axis of each row of advancing grooves being substantially parallel to a helical axis of the adjacent helical flight, a noncontinuous helical channel formed by a plurality of retracting grooves traversing said longitudinal portion in a reverse direction compared with the direction of the helical flight, each retracting groove cuts through at least one pass of the main channel and intersects and passes through the helical flight once to allow partial back flow and recirculate of material passing therethrough.

* * * * *